United States Patent [19]

Dholakia

[11] 4,439,853
[45] Mar. 27, 1984

[54] CAPACITIVE PLAYBACK STYLUS

[75] Inventor: Anil R. Dholakia, East Windsor, N.J.

[73] Assignee: RCA Corporation, New York, N.Y.

[21] Appl. No.: 292,057

[22] Filed: Aug. 12, 1981

[51] Int. Cl.³ .............................................. G11B 9/06
[52] U.S. Cl. .................................. 369/126; 369/151; 369/173
[58] Field of Search ............... 369/126, 150, 151, 170, 369/173

[56] References Cited

U.S. PATENT DOCUMENTS

| | | | |
|---|---|---|---|
| 2,960,759 | 11/1960 | Bondley | 369/173 |
| 4,104,832 | 8/1978 | Keizer | 51/281 R |
| 4,162,510 | 7/1979 | Keizer | 358/128 |
| 4,164,755 | 8/1979 | Matsumoto | 358/128 |
| 4,165,560 | 8/1979 | Matsumoto | 29/630 R |
| 4,398,282 | 8/1983 | Segawa | 369/126 |

FOREIGN PATENT DOCUMENTS 55-135342 10/1980 Japan .................. 369/126

*Primary Examiner*—Alan Faber
*Attorney, Agent, or Firm*—Birgit E. Morris; Donald S. Cohen; Joseph D. Lazar

[57] ABSTRACT

A capacitive information disc playback stylus comprising a dielectric support element having in one portion a conical body terminating in a constricted tip. The tip comprises a curved prow surface, a flat electrode surface remote from the prow, shoulders joining the constricted tip to the conical body, and side surfaces which join the prow and the flat surface. The side surfaces, the flat surface, and the prow surface define the edges of a disc-engaging surface.

4 Claims, 5 Drawing Figures

CAPACITIVE PLAYBACK STYLUS

This invention relates to a capacitive information disc playback stylus and a method for its manufacture.

BACKGROUND OF THE INVENTION

Matsumoto in U.S. Pat. Nos. 4,164,755 and 4,165,560 discloses a pickup stylus for use with a capacitive information disc. The stylus is fabricated from a tapered diamond support element having a plurality of conical portions with a common axis. Two of the conical portions are separated by an electrode-bearing surface. A record-engaging surface is provided in a tip region substantially orthogonal to the electrode-bearing surface. The diamond support element includes a pair of converging flat surfaces in the tip region which are disposed such that the intersection of the converging flat surfaces with the record-engaging surface defines the side edges of the record-engaging surface. The intersection of the converging flat surfaces with a conical portion remote from the electrode-bearing surface forms a prow.

The stylus taught by Matsumoto may be manufactured by grinding a conical surface at one end of the diamond element. An electrode-bearing surface is formed in the region of the conical tip and a record-engaging surface is made substantially orthogonal to the electrode-bearing surface. A pair of converging substantially flat rear surfaces are also formed in the region of the tip such that the intersection of the converging flat surfaces with the record-engaging surface defines the sides of said record-engaging surface.

Keizer in U.S. Pat. Nos. 4,104,832 and 4,162,510 has disclosed a capacitive information system keel-tipped playback stylus. The terminating portion of the tip is shaped to have a prow, a substantialy flat rear surface remote from the prow, a pair of substantially parallel side surfaces extending from the side edges of the rear surface, a bottom surface extending from the bottom edge of the rear surface, and additional surfaces extending from the prow intersecting the bottom and side surfaces.

The keel-tipped stylus may be formed with an abrasive lapping disc having a deep, coarse-pitched groove. The tip is fabricated from a tapering support element having a tip which is defined by a prow and a substantially flat "V"-shaped rear surface remote from the prow. The lands of the lapping disc lap shoulders for the stylus. The walls of the abrasive groove form the substantially parallel side surface.

In order to reduce the cost of manufacturing a capacitive information disc playback stylus, it is advantageous to have dielectric support elements mounted on a shank, for example, a metal such as titanium. Such starting materials are common in audio stylus. Audio styli often have a conical-shaped tip. However, since the width of the information track on a capacitive information disc record is substantially smaller than the information track recorded in an audio record, the shanked dielectric support element must be appropriately shaped. It would, therefore, be desirable to have inexpensive means for converting a shanked dielectric support element to a relatively low cost capacitive information disc playback stylus.

SUMMARY OF THE INVENTION

I have found a capacitive information disc playback stylus having a dielectric support element which includes in one portion a conical body terminating at a constricted tip. The tip includes a curved prow surface; a flat surface remote from the prow surface; shoulders joining the constricted tip to the conical body; and side surfaces which join the prow and the flat surface. The side surfaces, the flat surface, and the prow surface define the edges of a disc-engaging surface.

I have also found a method of preparing the playback stylus comprising the steps of lapping a flat in a first tip region and forming a keel tip at a given angle to the flat in a second tip region such that the flat forms the surface remote from the prow.

DETAILED DESCRIPTION OF THE INVENTION

Figures 1, 2, 3:
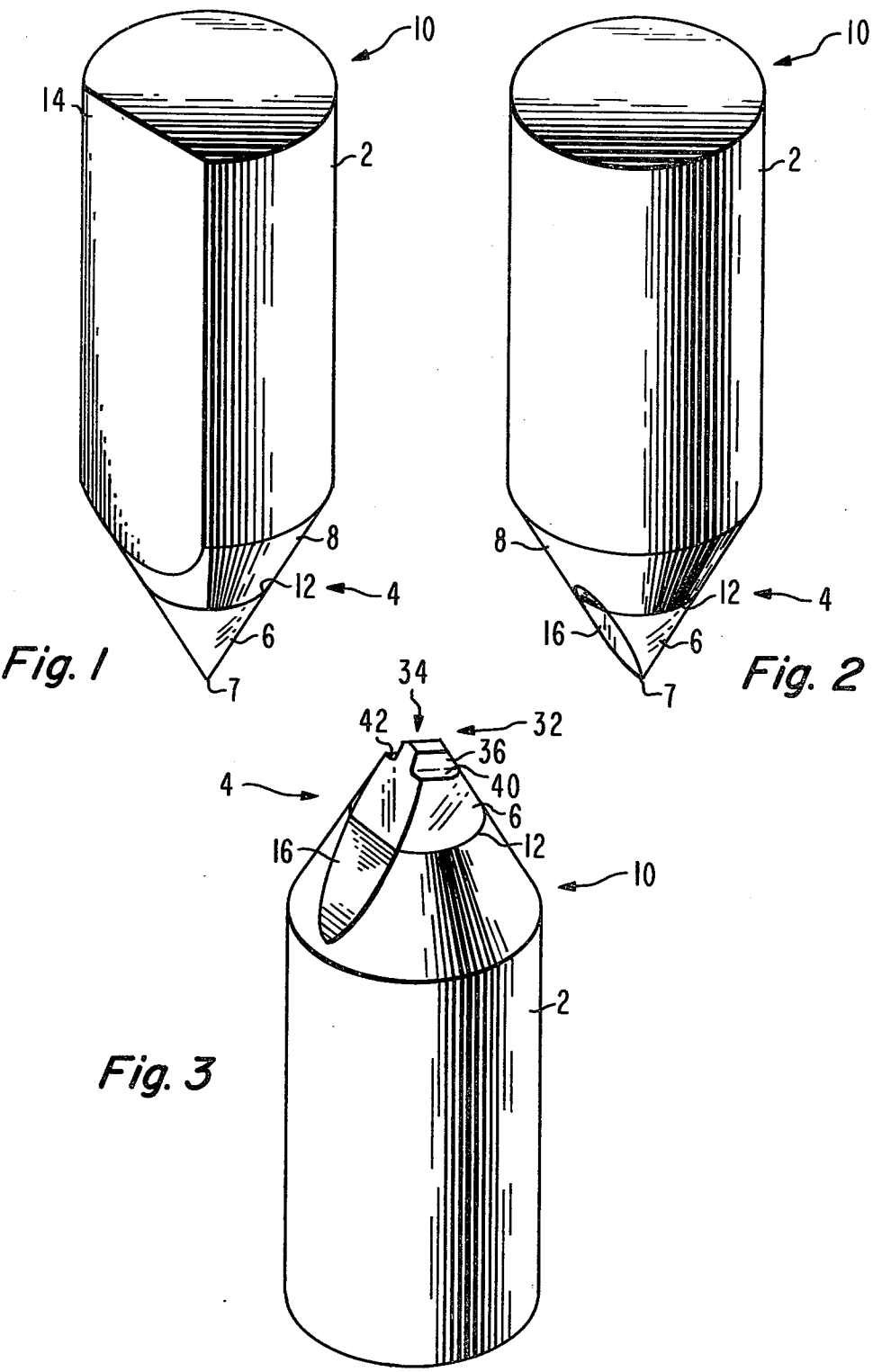
FIG. 1 is a perspective view of a stylus element.
FIG. 2 is a perspective view of a stylus element having an electrode surface.
FIGS. 3 and 4 are perspective views of a stylus of the present invention.

The present invention will be illustrated by means of the Drawing. FIG. 1 is a perspective view of a stylus element 10. The stylus element 10 has a shank 2 and a conical tip region 4. The shank 2 material may, for example, be a metal such as titanium. The tip region may consist of two components 6 and 8. The first tip region component 6 which terminates at the tip end 7 includes the tip region 4 portion which will contact the capacitive information disc during playback and is generally a hard dielectric material such as diamond, sapphire, and the like. The second tip region component 8 may be fabricated, for example, from the same material as either the first tip region component 6 or the shank region material 2. The interface 12 between the second tip region component 8 and the first tip region component 6 is shown for the case where the first and second tip region components 6 and 8, respectively, are fabricated from different materials. The two tip region components 6 and 8 may be bonded at the interface 12 by brazing, soldering, or by any other suitable method in the art. A reference flat may be machined into the stylus element 10 to orient it for the lapping operations. The reference flat can be positioned along the shank 2 and extend into the tip region 4 as shown in FIG. 1.

FIG. 2 is a perspective view of a stylus element 10 in which an electrode surface 16 has been lapped as a flat. The reference flat 14 of FIG. 1 is not present in FIG. 2 or the other FIGURES. In lapping the electrode surface 16, any convenient method may be employed. For lapping a first tip region component 6 which is diamond, a diamond powder having an average particle diameter of between about 0.1 to 0.25 micrometer may be employed as the charge on a scaife surface which acts as the abrasive lapping surface. The electrode surface 16 may be made conductive, for example, by coating with a metal such as titanium, hafnium and the like or by ion implantation.

Figure 4:
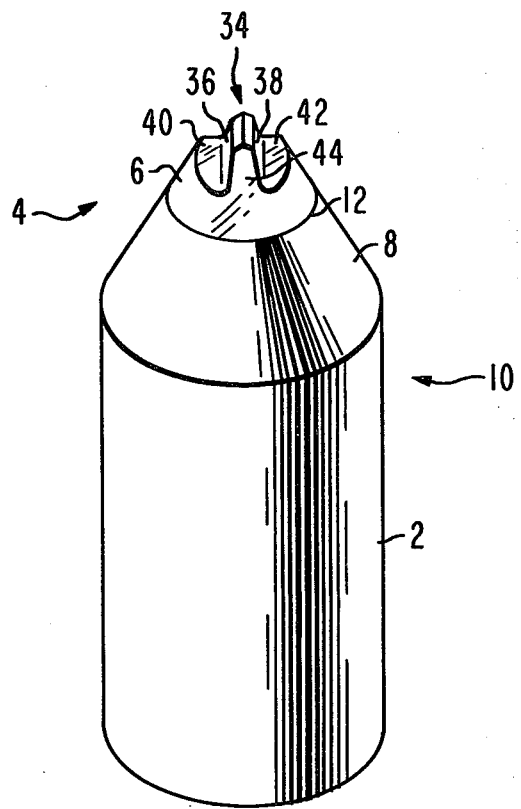

FIGS. 3 and 4 are perspective views of a stylus element 10 having a keel tip 32 lapped into the tip region 4. The keel tip 32 includes a bottom surface 34 which engages a capacitive information disc (not shown). If the capacitive information disc includes a grooved surface, the bottom surface 34 is generally shaped to conform to the groove, typically a "V"-shape. One method for conformally lapping the bottom surface is disclosed in the copending application of Leedom, et al., "Conformal Video Disc Stylus", Ser. No. 158,943, filed June 12, 1980. In the Leedom et al. method the bottom surface 34 is lapped with an abrasive silicon oxide layer so that the bottom surface conforms to the groove shape of the information disc.

The keel tip 32 also includes sides 36 and 38 and shoulders 40 and 42, which are joined to their respective sides by means of a concave junction. A curved prow 44, which is a portion of the conical body, is present opposite the electrode surface 16. The width of the electrode surface 16 is generally less than or equal to the width of the information track in the capacitive information disc.

The angle between the electrode surface 16 and the bottom surface 34 may be any convenient or desired angle. A preferred angle is about 90 degrees. The stylus element 10 is generally mounted in a cartridge at an angle such that the bottom surface 34 engages the capacitive information disc surface.

The conical portion of the stylus element 10 generally has an axis which corresponds to the major axis of the stylus element 10. Any desired cone angle may be employed. Generally, the preferred cone angle is in the range of about 30 to 60 degrees. The cone angle is defined as the angle made by a projection of the cone onto a flat plane. The resulting angle at the apex of the projection lines which define the cone is the cone angle. A narrower cone angle is preferred because less material must be removed in forming the keel tip. The present invention has a keel tip which is somewhat modified from that of the aforementioned Keizer patents. The prow 44 is not an edge, but rather a curved surface which is a portion of the conical tip region 4. As a result, the bottom surface 34 does not meet at a point, but rather at an arc defined by the intersection of the bottom surface 34 and the end of the prow 44. If the sides of the keel tip are parallel, the bottom surface edges will approximate a rectangle. If the sides are not parallel, the bottom surface will approximate a trapezoid.

The keel tip 32 may be fabricated by means of an abrasive-coated, deep-grooved, lapping disc as described in Keizer. A preferred lapping abrasive coating is a $SiO_x$ layer prepared by a glow discharge deposition from $SiH_4$ and $N_2O$ precursors.

The present invention, which may be employed with either a grooved or nongrooved disc, will be further illustrated by the following Example. However, it is to be understood that the invention is not meant to be limited to the details presented therein.

EXAMPLE

A stylus element 10 as shown in FIG. 1 was employed having a cone angle of 40 degrees to prepare a capacitive information disc playback stylus. The first tip region component 6 was an unoriented diamond having a height from the tip end 7 to the interface 12 of 152 micrometers. The second tip region component 8 and the shank 2 were sapphire. The shank diameter was 400 micrometers. The length of the sapphire, including the shank 2 and the second tip region component 8, was 150 milli-inches (3.81 millimeters).

An electrode face was lapped into the tip region 4 at an angle of 35 degrees to the stylus element axis. A cast iron scaife rotating at 3600 revolutions per minute was employed in the lapping operation. The sacife surface was charged with a diamond powder having an average particle size of 0.1 micrometer.

A keel tip was lapped on the surface opposite the electrode surface so that the bottom surface of the keel tip was orthogonal to the electrode surface. A deep, coarse-pitched abrasive lapping disc was employed having an abrasive $SiO_x$ layer prepared by glow discharge deposition from $SiH_4$ and $N_2O$ precursors according to the copending application of Kaganowicz, "Method for Preparing on Abrasive Coating," Ser. No. 963,819, filed Nov. 27, 1978, now U.S. Pat. No. 4,328,646, issued May 11, 1982. The stylus element was mounted in a cartridge so that the stylus element axis makes an angle of 55 degrees to the horizontal. A bottom surface of the appropriate length was also lapped with the groove bottom of the abrasive lapping disc.

Figure 5:
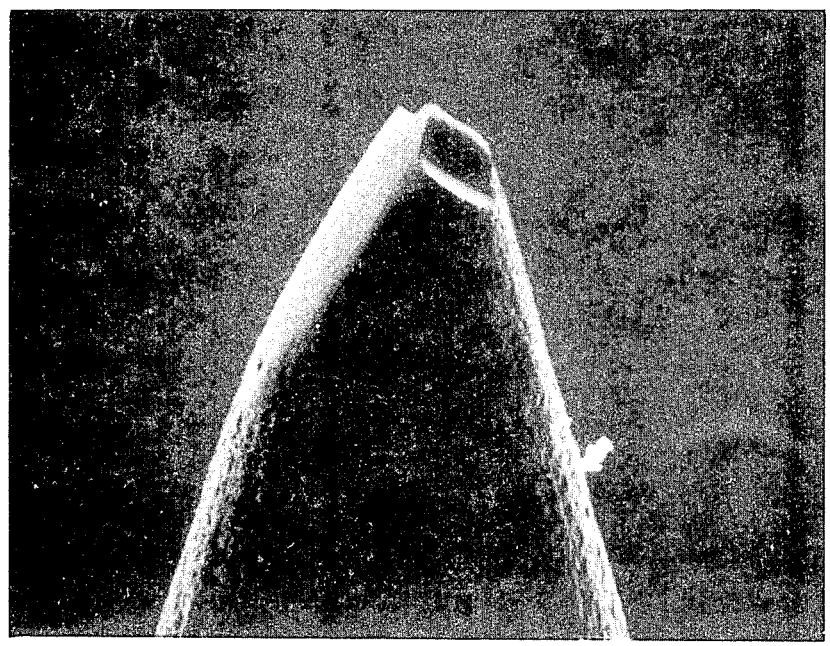
FIG. 5 is a photograph of a stylus of the present invention.

A photomicrograph of the resulting playback stylus at a magnification of 2000× is shown in FIG. 5. The length of the bottom surface was 6 micrometers. The width of the bottom surface between the parallel side walls was 2 micrometers. The height of the keel tip from the shoulders to the bottom surface was 3 micrometers.

I claim:

1. A capacitive information disc playback stylus for use with a capacitive information disc which has an information track recorded as geometric surface variations, said stylus comprising a dielectric support element having in one portion a conical body terminating at a constricted tip wherein the stylus comprises:
   a conical prow surface;
   a flat electrode surface remote from the prow;
   shoulders joining the constricted tip to the conical body;
   side surfaces which join the prow and the flat electrode surface; and
   a shank bonded to said conical body remote from said tip;
   wherein the side surfaces, the flat electrode surface, and the prow surface define the edges of a surface for engaging said disc.

2. A stylus in accordance with claim 1 wherein the dielectric support element is diamond.

3. A stylus in accordance with claim 1 wherein the shank is metal.

4. A stylus in accordance with claims 1 or 3 wherein the shank includes a reference surface.

* * * * *